3,071,466
Patented Jan. 1, 1963

3,071,466
PHOTOGRAPHIC SILVER HALIDE FILMS COMPRISING AN ANCHORING LAYER
Helfried Klockgether and Wolfgang Himmelmann, Leverkusen, and Ottmar Wahl, Opladen, Germany, assignors to AGFA Aktiengesellschaft, Leverkusen, Germany, a corporation of Germany
No Drawing. Filed July 7, 1959, Ser. No. 825,426
Claims priority, application Germany July 9, 1958
4 Claims. (Cl. 96—87)

The present invention relates to photographic silver halide films comprising an anchoring layer.

Photographic film material generally consists of a hydrophobic layer support and a hydrophilic, light-sensitive silver halide emulsion layer. In order to produce a bonding between the support and the light-sensitive layer, it is necessary to employ bonding or anchoring layers. They unite the support and the photographic silver halide emulsion layer and ensure that these neither become detached in the dry state nor float off in the wet state during processing in the baths.

It is known that mixed acetals of vinyl alcohol polymers with aldehydes having water-solubilizing groups and aldehydes having no water-solubilizing groups, which acetals are soluble in organic solvents and highly swellable in water are very suitable as bonding substances for anchoring layers which are applied to hydrophobic film supports.

Suitable vinyl alcohol polymers for preparing said hydrophilic acetals are polyvinyl alcohols, preferably such of high molecular weight of about 20,000 to 60,000; partially hydrolyzed polyvinyl esters, such as partially hydrolyzed polyvinyl acetate and polyvinyl propionate; partially or completely hydrolyzed copolymers of organic vinyl esters, such as vinyl acetate and vinyl propionate, with minor molar proportions of vinyl chloride, ethylene, or other monoethylenically unsaturated monomers which are not hydrolyzable or are more difficultly hydrolyzable than said organic vinyl esters. Generally speaking, said vinyl alcohol polymers consist of saturated aliphatic hydrocarbon chains of a molecular weight of at least 1000 preferably of about 1000 to 50,000 to which are bonded per 100 carbon atoms 30 to 50 hydroxyl groups.

Suitable examples of aldehydes with water-solubilizing groups are aldehydes containing carboxylic acid and/or sulphonic acid and/or hydroxy groups, aldehydes containing sulphonic acid groups being preferred. Such aldehydes are for instance benzaldehyde-2-sulphonic acid, benzaldehyde-2,4-disulphonic acid and hydroxy benzaldehyde. Benzaldehyde, tolyl aldehyde, chlorobenzaldehyde etc. have proved suitable as aldehydes that are devoid of water-solubilizing groups, that is to say of hydroxy and of acid groups. The degree of acetalation can be varied within certain limits, but the best results were produced with products in which 50 to 60 percent of all the hydroxyl groups of the vinyl alcohol polymers were acetalized.

Such mixed acetals may for example be composed of units of the following general formulae:

$$\left[\begin{array}{c}-CH_2-CH-CH_2-CH-\\ \phantom{XX}O\phantom{XXXX}O\\ \phantom{XXXXX}\diagdown\phantom{X}\diagup\\ \phantom{XXXXXXX}CH\\ \phantom{XXXXXXX}|\\ \phantom{XXXXXXX}R_1\end{array}\right]_x$$

$$\left[\begin{array}{c}-CH_2-CH-CH_2-CH-\\ \phantom{XX}O\phantom{XXXX}O\\ \phantom{XXXXX}\diagdown\phantom{X}\diagup\\ \phantom{XXXXXXX}CH\\ \phantom{XXXXXXX}|\\ \phantom{XXXXXXX}R_2\end{array}\right]_y$$

$$\left[\begin{array}{c}-CH_2-CH-\\ \phantom{XX}|\\ \phantom{XX}OH\end{array}\right]_z$$

wherein $R_1$ represents alkyl having 2 to 10 carbon atoms; aryl such as phenyl, tolyl, xylyl, chlorophenyl, bromophenyl; aralkyl such as benzyl or cycloalkyl; substituted by one or more water-solubilizing groups, that is to say by hydroxy, carboxylic acid and/or sulphonic acid groups, preferably sulphonic acid groups and, if desired, by further substituents. The acid groups may be neutralized by salt formation with alkali metal hydroxides, ammonia or amines which form water soluble sals; and $R_2$ represents an alkyl, aryl, aralkyl or cycloalkyl group which may be substituted by groups that are not water-solubilizing. Phenyl, tolyl, chlorophenyl, cyclohexyl, benzyl, methyl and butyl are examples of non-water-solubilizing groups;

the ratio between $x$, $y$ and $z$ depends on the constitution of $R_1$ and $R_2$ and is so chosen that the products are soluble in organic solvents, more especially methanol, but are only swellable in cold water.

Such acetals are for instance disclosed in Belgian Patent No. 569,823.

It is also known that to improve the bonding action, these mixed acetals are preferably used in admixture with film-forming compounds of high molecular weight containing hydroxyl groups, and being soluble in organic solvents. Such compounds are for example obtained:

(1) By copolymerization of (a) hydrophobic monoethylenically unsaturated monomers with (b) ethylenically unsaturated monomers containing hydroxyl groups. Suitable monomers of the type (a) are for example vinyl esters (vinyl chloride, vinylidene chloride, vinyl acetate, vinyl propionate, vinyl butyrate, vinyl benzoate); monovinyl aromatic compounds (styrene, vinyl naphthaline, p-chlorostyrene, p-methylstyrene, α-methylstyrene); acrylic acid nitrile; esters of α-β-ethylenically unsaturated carboxylic acids (acrylic acid, methacrylic acid, fumaric acid) with aliphatic and cycloaliphatic alcohols having 1 to 10 carbon atoms (methanol, ethanol, propanol, butanol, octanol, cyclohexanol); and monovinyl ethers of aliphatic saturated monohydric alcohols having preferably 3 to 10 carbon atoms (vinyl propyl ether, vinyl butyl ether, vinyl cyclohexyl ether). As components of the type (b) there may be cited by way of example monoethylenically unsaturated alcohols, such as allyl alcohol; monoethylenically unsaturated monomers containing phenolic hydroxyl groups such as p-hydroxystyrene, monovinylethers of polyhydric saturated aliphatic and cycloaliphatic alcohols, such as ethylene glycol monovinyl ether, propylene glycol monovinyl ether, butylene glycol monovinyl ether, glycerol monovinyl ether, trimethylol propane monovinyl ether; and monoesters of ethylenically unsaturated carboxylic acids such as acrylic and methacrylic acid with polyhydric alcohols such as glycol, butanediol, glycerol and trimethylol propane;

(2) By copolymerization of a monoethylenically unsaturated hydrophobic component which is not saponifiable or can only be saponified with difficulty, for example vinyl chloride, the above monovinyl aromatic compounds and/or vinyl ethers, with a readily saponifiable monoethylenically unsaturated component containing esterified OH groups, esters of vinyl alcohol with monocarboxylic acids for example vinyl acetate, vinyl propionate, vinyl butyrate or esters of allyl alcohol with monobasic saturated carboxylic acids such as allyl acetate or allyl propionate, and subsequent saponification. Further suitable copolymers are the copolymers of the above monovinyl-aromatic compounds and/or vinyl ethers with vinyl acetate;

(3) By partial saponification of a readily saponifiable ester of polyvinyl alcohol, polyallyl alcohol or cellulose, such as polyvinyl acetate, polyvinyl propionate, polyvinylbutyrate, polyvinyl benzoate, polyallylacetate, polyallylpropionate, polyallyl butyrate, cellulose acetate, cellulose propionate.

The aforementioned products have been found to be especially valuable if they contain about 2 to 20 percent by weight of hydroxyl groups. The products disclosed above are well-known as such. The copolymers are produced by known methods as for instance by polymerization of the cited components in mass, in solution or in aqueous emulsion or dispersion. The saponification of the disclosed copolymers is carried through by known methods. It may be effected by treating the copolymers at elevated temperature in alcoholic solution with strong inorganic or organic acids, such as sulfuric acid or p-toluene sulfonic acid. The degree of saponification of these compounds must be so adjusted that they are still readily soluble in organic solvents such as acetone.

Suitable film-forming polymers containing hydroxyl groups are for instance copolymers having incorporated therein 45 to 70 percent by weight of vinyl chloride, 5 to 30 percent by weight of vinyl hydroxide and 10 to 40 percent of organic vinyl esters such as vinyl acetate, vinyl propionate, vinyl butyrate. These copolymers are built up of structural units of the following general formulae:

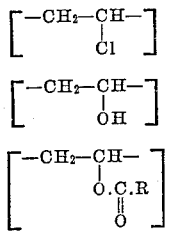

in which R stands for alkyl, aryl (phenyl, tolyl) aralkyl (benzyl) and cyclo alkyl (cyclohexyl).

Among the partially saponified cellulose esters, cellulose acetates having an acetic acid content of 52 to 56 percent by weight, are of special interest.

For producing the anchoring or subbing layers the aforementioned polymers containing hydroxyl groups are preferably applied in amounts of 10 to 50 percent by weight as calculated on the total amount of the said polymers and the aforementioned mixed acetals.

The anchoring layers produced with the aforementioned mixtures of mixed acetals and substances containing hydroxyl groups generally satisfy the requirements of the intermediate layer. It is only with certain types of films which are exposed either to the photographic baths for an extremely long time, or to high mechanical stressing in the wet state, that certain difficulties arise. In these cases, the photographic emulsion can be displaced in the wet state from the support.

It has now been found that this defect can be obviated by adding cross-linking agents to the intermediate layers described above. Compounds containing at least two 1,2-epoxide groups in their molecule are suitable as cross-linking agents. Such compounds are formed by reaction of epichlorohydrin or epihydrin alcohol (1-hydroxy-2,3-epoxypropane, also known as hydroxymethyloxirane) with compounds of low molecular weight having reactive groups, for example amino, hydroxyl, carboxyl and sulphonic acid groups. They can be prepared by methods known per se. Since the compositions for the production of the subbing layers which have been described and which comprise the above mixed acetals or mixtures of the mixed acetals and polymers containing hydroxyl groups can be applied in every case from organic solvents, preferably mixtures of methanol and acetone, to the film, only those compounds containing epoxide groups and having an adequate solubility in organic solvents are considered.

As compounds of a low molecular weight which are used as starting materials for the production of the polyepoxides, those having a molecular weight up to about 300 can be used. Suitable 1,2-polyepoxides are for instance:

Polyglycidyl ethers of polyhydric alcohols or polyhydric phenols such as glycol diglycidyl ether, butanediol diglycidyl ether, glycerol triglycidyl ether, trimethylolpropane triglycidyl ether, pentaerythritol tetraglycidyl ether, resorcinol diglycidyl ether, the digylcidyl ethers of diphenylol propane and diphenylol methane and glycerol diglycidyl ether; or Aliphatic, cycloaliphatic, aromatic tertiary mono- or polyamines containing at least two 2,3-epoxypropyl groups bonded to nitrogen as for instance primary monoalkyl amines such as methyl-, ethyl-, propyl-, butyl-, hexyl-amine in which the two hydrogen atoms bonded to nitrogen are replaced by 2,3-epoxypropyl groups, alkylene diamines such as ethylene diamine, propylene diamine, hexamethylene diamine in which one hydrogen atom of each amino group is replaced by an alkyl group such as methyl or ethyl and the two other hydrogen atoms of the amino groups are replaced by 2,3-epoxypropyl groups, aromatic amines such as aniline, tolyl amine, chlorophenyl amine in which the two hydrogen atoms of the amino group are replaced by 2,3-epoxypropyl groups, 4,4-diamino-diphenyl-methane in which one hydrogen of each amino group is replaced by alkyl such as methyl, ethyl and the two other hydrogen atoms are replaced by 2,3-epoxypropyl groups;

Polycarboxylic and polysulfonic acids such as malonic acid, succinic acid, adipic acid, phthalic acid and terephthalic acid in which the hydrogen atoms of the carboxylic groups are replaced by 2,3-epoxypropyl groups.

The quantity of added cross-linking agent can be varied within relatively wide limits without substantially influencing the efficacy thereof. Good results are produced with quantities of 5 to 10 percent, calculated on solid substance of the aforementioned compositions.

In order to cause a rapid cross-linking, it is advisable for the bonding layer which is to be cross-linked to be heated for a few minutes at temperatures of 80 to 150° C. after application to the film support, this being necessary in any case to reduce the disadvantageously acting residual solvent content.

Due to the addition of cross-linking agents, the strong swelling of the subbing layer in the photographic baths is reduced. This swelling is harmful to the wet bonding. The same effect could not be produced with other cross-linking agents more especially employed for hardening gelatine, such as aldehydes or methylol compounds.

The present compositions may be used for producing anchoring layers on customary water-insensitive film materials such as films produced from cellulose esters as for instance cellulose nitrate, cellulose triacetate, cellulose acetobutyrate, polyvinyl chloride, copolymers of vinyl chloride, polycarbonates such as polycarbonic acid esters of bis(hydroxyaryl)alkanes and polyamides.

The process is to be further explained by the following examples:

*Example 1*

A foil consisting of acetyl cellulose (acetic acid content 60.2 percent) and having a thickness of 0.14 mm. is treated by the dipping process with the following base solution:

10 g. of a mixed acetal of polyvinyl alcohol with sodium benzaldehyde sulphonate and benzaldehyde and having the following composition—vinyl alcohol benzaldehyde monosulphonate acetal 47.3 percent by weight, vinyl alcohol benzaldehyde acetal 24.2 percent by weight, vinyl alcohol 28.5 percent by weight.

3 g. of a partially saponified acetyl cellulose (56 percent acetic acid), 1 g. of a hardening agent of the following constitution:

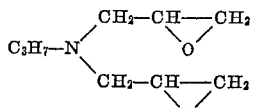

350 cc. of methanol,
650 cc. of acetone.

After the base solution has been applied, the foil is dried at 100 to 120° C. Thereafter, it is coated with a gelatino silver halide emulsion, which adheres well in both the dry and wet state, even with rinsing for an extremely long period and mechanical stressing in the wet state.

*Example 2*

A foil consisting of 4,4'-dihydroxydiphenyl methane polycarbonate with a thickness of 0.1 mm. is treated in the dipping process with the following base solution:

10 g. of a mixed acetal of polyvinyl alcohol with sodium benzaldehyde disulphonate and benzaldehyde with the following composition.—vinyl alcohol benzaldehyde disulphonate acetal 33.5 percent by weight, vinyl alcohol benzaldehyde acetal 35.2 percent by weight, vinyl alcohol 31.3 percent by weight,
3 g. of a partially saponified copolymer of vinyl chloride and vinyl acetate with the following composition.— vinyl chloride 63.2 percent by weight, vinyl alcohol 25.3 percent by weight, vinyl acetate 11.5 percent by weight,
0.8 g. of a cross-linking agent produced from cyanuric acid and epihydrin alcohol of the following constitution:

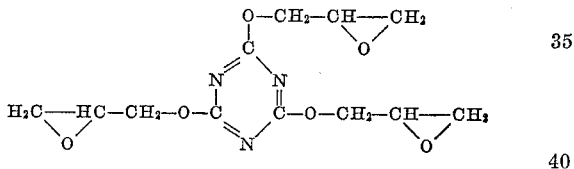

450 c. of methanol,
550 cc. of acetone.

The foil is further processed as indicated in Example 1 and an excellent bonding effect is also produced in this case.

*Example 3*

A foil consisting of a copolymer of 80 percent vinyl chloride and 20 percent of maleic acid methyl ester and having a thickness of 0.12 mm. is treated in the dipping process with the following base solution:

10 g. of a mixed acetal of the following composition.— vinyl alcohol butyl aldehyde sulphonate acetal 39.2 percent by weight, tolyl aldehyde acetal 30.0 percent by weight, vinyl alcohol 30.8 percent by weight,
3 g. of a partially saponified polymer of vinyl acetate with the following composition.—vinyl alcohol 36.5 percent by weight, vinyl acetate 63.5 percent by weight,
1 g. of a cross-linking agent of phthalic acid and epichlorhydrin of the following constitution:

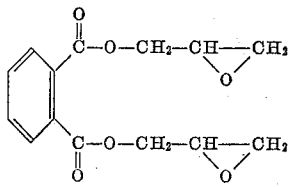

500 cc. of methanol,
500 cc. of acetone.

The foil is further processed as indicated in Example 1 and a very good bonding effect is also produced in this case.

The binding agent of the silver halide emulsion layer generally consists of gelatine. However, it may also be possible to replace the gelatine at least partially by other hydrophilic colloids such as polyvinyl alcohol, partially saponified cellulose esters such as cellulose acetate or by the other hydrophilic colloids which are well-known in the photographic art. As regards the mixed acetals those are preferred in which 50–65 percent of all hydroxy groups of the polyvinyl alcohol are acetalized and in which the acetal groups being devoid of water solubilizing groups are present in a molar excess over those containing water-solubilizing groups, at least 10 percent of the hydroxy groups being acetalized with the last mentioned aldehydes.

What is claimed is:

1. A photographic element comprising
    (a) a hydrophobic film support,
    (b) a hydrophilic light-sensitive silver halide emulsion layer, the binding agent of which consists essentially of gelatin, and
    (c) an anchoring layer between the said support and the said light-sensitive layer, the said anchoring layer containing a polymeric product of
        (I) a mixed acetal of a vinyl alcohol polymer having 50 to 65% of its original free hydroxy groups acetalized with a combination of an aldehyde containing a water-solubilizing substitutent of the class consisting of hydroxy, carboxy, and sulpho groups, and carboxy and sulpho groups which have been neutralized with alkali metals, ammonia, and amines, and an aldehyde of a hydrophobic structure devoid of the aforementioned water-solubilizing groups,
        (II) a polymeric product of the class consisting of
            (A) a copolymer of a hydrophobic component of the class consisting of vinyl chloride, styrene, and vinyl ethers with a hydrophilic component containing hydroxy groups of the class consisting of allyl alcohol, styrene substituted with hydroxy groups, and partially saponified vinyl esters, the ester grouping of which has up to 5 carbon atoms, and
            (B) a polymeric product containing hydroxy groups of the class consisting of partially saponified polyvinyl esters and partially saponified cellulose esters, the amount of the said polymeric product being 10 to 50% by weight of the copolymer of the anchoring layer, and
        (III) 5 to 10%, based on the total amount of the layer-forming polymeric product, of a 1,2-epoxy compound of the class consisting of a polyglycidyl ethers of polyhydric alcohols, polyglycidyl ethers of polyhydric phenols, and aliphatic, cycloaliphatic, and aromatic tertiary amines in which two 2,3-epoxypropyl groups are bonded to nitrogen, and polyglycidyl esters of polycarboxylic acids.

2. A photographic element comprising
    (a) a hydrophobic film support of a polycarbonate of a bis(hydroxyphenyl)alkane,
    (b) a hydrophilic light-sensitive silver halide gelatin emulsion layer, and
    (c) an anchoring layer between the said support and the said light-sensitive layer, the said anchoring layer consisting of a polymeric product containing the following components:
        (I) A mixed acetal of a vinyl alcohol polymer having 50 to 65° of its original free hydroxy groups acetalized with a combination of an aldehyde containing a water-solibizing substituent of the class consisting of hydroxy, carboxy and sulpho groups, and carboxy and sulpho groups which have been neutralized with alkali metals, ammonia, and amines, and an aldehyde of a hydrophobic structure devoid of the aforementioned water-solubilizing groups,
(II) 10 to 50% of a partially saponified copolymer of vinyl chloride and vinyl acetate, and
(III) 5 to 10%, based on the total amount of the layer-forming polymeric product, of a 1,2-epoxy compound of the class consisting of polyglycidyl ethers of polyhydric alcohols, polyglycidyl ethers of polyhydric phenols, and aliphatic, cycloaliphatic and aromatic tertiary amines, in which two 2,3-epoxypropyl groups are bonded to nitrogen, and polyglycidyl esters of polycarboxylic acids.

3. In a process for producing a photographic element by coating a hydrophobic film support with an anchoring layer and overcoating the said anchoring layer with a hydrophilic light-sensitive silver halide emulsion layer, the binding agent of which consists essentially of gelatin, the improvement which comprises applying the said anchoring layer by casting it from a solution in an organic solvent containing the following components
(I) a mixed acetal of a vinyl alcohol polymer having 50 to 65% of its original free hydroxy groups acetalized with a combination of an aldehyde containing a water-solubilizing substituent of the class consisting of hydroxy, carboxy, and sulpho groups, and carboxy and sulpho groups which have been neutralized with alkali metals, ammonia, and amines, and an aldehyde of a hydrophobic structure devoid of the aforementioned water-solubilizing groups,
(II) a polymeric product selected from the class consisting of
(A) a copolymer of a hydrophobic component selected from the class consisting of vinyl chloride, styrene, and vinyl ethers with a hydrophilic component containing hydroxy groups of the class consisting of allyl alcohol, styrene substituted with hydroxy groups, and partially saponified vinyl esters, the ester grouping of which has up to 5 carbon atoms and
(B) a polymeric product containing hydroxy groups of the class consisting of partially saponified polyvinyl esters and partially saponified cellulose esters, the amount of the said polymeric product being 10 to 50% by weight of the copolymer of the anchoring layer, and (III) 5 to 10% based on the total amount of the layer-forming polymeric product, of a 1,2-epoxy compound of the class consisting of polyglycidyl ethers of polyhydric alcohols, polyglycidyl ethers of polyhydric phenols, and aliphatic, cycloaliphatic, and aromatic tertiary amines in which two 2,3-epoxypropyl groups are bonded to nitrogen, and polyglycidyl esters of polycarboxylic acids.

4. In a process for producing a photographic element by coating a hydrophobic film support of a polycarbonate of a bis(hydroxyphenyl)alkane with an anchoring layer and over-coating said anchoring layer with a light-sensitive silver halide gelatin emulsion layer, the improvement which comprises applying the said anchoring layer by casting it from a solution in an organic solvent containing the following components
(I) a mixed acetal of a vinyl alcohol polymer having 50 to 65% of its orignal free hydroxy groups acetalized with a combination of an aldehyde containing a water-solubilizing substituent of the class consisting of hydroxy, carboxy, and sulpho groups and carboxy and sulpho groups which have been neutralized with alkali metals, ammonia, and amines, and an aldehyde of a hydrophobic structure devoid of the aforementioned water-solubilizing groups;
(II) 10 to 50% of a partially saponified copolymer of vinyl chloride and vinyl acetate and
(III) 5 to 10%, based on the total amount of the layer-forming polymeric product, of a 1,2-epoxy compound of the class consisting of polyglycidyl ethers of polyhydric alcohols, polyglycidyl ethers of polyhydric phenols, and aliphatic, cycloaliphatic, and aromatic tertiary amines in which 2,3-epoxy-propyl groups are bonded to nitrogen, and polyglycidyl esters of polycarboxylic acids.

References Cited in the file of this patent
UNITED STATES PATENTS

| | | |
|---|---|---|
| 2,133,110 | Nadeau | Oct. 11, 1938 |
| 2,310,943 | Dorough et al. | Feb. 16, 1943 |
| 2,713,565 | Howard et al. | July 19, 1955 |
| 2,713,567 | Scheibli | July 19, 1955 |
| 2,734,825 | Morgan | Feb. 14, 1956 |
| 2,844,571 | Broderick | July 22, 1958 |

UNITED STATES PATENT OFFICE
CERTIFICATE OF CORRECTION

Patent No. 3,071,466                                  January 1, 1963

Helfried Klockgether et al.

It is hereby certified that error appears in the above numbered patent requiring correction and that the said Letters Patent should read as corrected below.

In the grant, lines 1 and 2, for "Wolfgang, of Himmelmann, Leverkusen," read -- Wolfgang Himmelmann, of Leverkusen, --.

Signed and sealed this 10th day of October 1967.

(SEAL)
Attest:

Edward M. Fletcher, Jr.                            EDWARD J. BRENNER
Attesting Officer                                     Commissioner of Patents